(12) United States Patent
Hamon et al.

(10) Patent No.: US 10,415,733 B2
(45) Date of Patent: Sep. 17, 2019

(54) QUICK CONNECTOR

(71) Applicant: Cooper-Standard Automotive, Inc., Novi, MI (US)

(72) Inventors: Thierry Hamon, Rennes (FR); Pierre Youinou, La Meziere (FR); Jacob Garrett, Columbiaville, MI (US); Steve Frederiksen, Clarkston, MI (US); Ken Gocha, Flint Charter Township, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 306 days.

(21) Appl. No.: 15/239,233

(22) Filed: Aug. 17, 2016

(65) Prior Publication Data

US 2018/0051838 A1    Feb. 22, 2018

(51) Int. Cl.
| | |
|---|---|
| *F16L 37/088* | (2006.01) |
| *F16L 37/10* | (2006.01) |
| *F16L 23/18* | (2006.01) |
| *F16L 37/098* | (2006.01) |

(52) U.S. Cl.
CPC .............. *F16L 37/10* (2013.01); *F16L 23/18* (2013.01); *F16L 37/088* (2013.01); *F16L 37/0985* (2013.01)

(58) Field of Classification Search
CPC ....... F16L 35/00; F16L 37/04; F16L 37/0842; F16L 37/088
USPC ................................ 285/1, 306, 305, 83, 86
See application file for complete search history.

(56) References Cited

U.S. PATENT DOCUMENTS

| | | | |
|---|---|---|---|
| 2,954,264 A | | 9/1960 | Tisch |
| 4,226,445 A | * | 10/1980 | Kramer ................. F16L 37/088 285/81 |
| 4,753,458 A | | 6/1988 | Case et al. |
| 4,875,711 A | * | 10/1989 | Watanabe ........... F16L 19/0231 285/86 |
| 5,028,080 A | | 7/1991 | Dennany, Jr. |
| 5,704,658 A | * | 1/1998 | Tozaki ................. F16L 37/088 285/305 |
| 5,806,898 A | * | 9/1998 | Hollnagle ............. F16L 37/098 285/86 |

(Continued)

FOREIGN PATENT DOCUMENTS

EP    1821022    8/2007

OTHER PUBLICATIONS

Search Report in counterpart EP Application No. 17173263.9-1010, as mailed by the EPO dated Jan. 22, 2018.

(Continued)

*Primary Examiner* — David Bochna
(74) *Attorney, Agent, or Firm* — Stephen T. Olson; Harness, Dickey & Pierce, P.L.C.

(57) ABSTRACT

A quick connector for releasably engaging a tube having a radial flange includes a housing, a retaining member and a blocking member. The housing is a generally tubular housing. The retaining member is carried by the housing and is movable from a first position to a second position. In the first position, the retaining member is operative to secure the tube relative to the housing in the first position. The blocking member is operative to resisting movement of the retaining member from the first position to the second position.

19 Claims, 6 Drawing Sheets

(56) References Cited

U.S. PATENT DOCUMENTS

| | | | | |
|---|---|---|---|---|
| 6,068,303 | A * | 5/2000 | Hollnagle | F16L 35/00 |
| | | | | 285/374 |
| 7,874,595 | B2 * | 1/2011 | Lechner | F16L 37/098 |
| | | | | 285/305 |
| 8,708,375 | B2 * | 4/2014 | Knis | F16L 37/098 |
| | | | | 285/305 |
| 2005/0189764 | A1 | 9/2005 | Ono et al. | |
| 2006/0192381 | A1 * | 8/2006 | Moretti | F16L 37/0842 |
| | | | | 285/305 |
| 2007/0120362 | A1 | 5/2007 | Poder et al. | |
| 2013/0175795 | A1 * | 7/2013 | Taylor | F16L 37/088 |
| | | | | 285/45 |
| 2014/0125051 | A1 | 5/2014 | Barthel et al. | |
| 2014/0197629 | A1 | 7/2014 | Barthel et al. | |
| 2017/0114938 | A1 * | 4/2017 | Tomlinson | F16L 37/088 |

OTHER PUBLICATIONS

Extended European search report in parallel application EP 17173263. 9-101/3293431, EPO, Munich, dated May 17, 2018.

* cited by examiner

QUICK CONNECTOR

FIELD

The present teachings generally relate to quick connectors for quickly connecting to and establishing fluid communication between tubular members. More particularly, the present teachings relate to a quick connector having a blocking member for resisting radial expansion of a retaining member and thereby prevent premature blow-off. The present teachings also more particularly relate to a sealing member for a quick connector.

BACKGROUND

Various quick connectors are known. One such quick connector is shown and described in European Patent Application EP 1 821 022 A1. This quick connector generally includes a housing and a retainer. Fingers of the retainer cooperate with a flange of a tube to normally retain the tube. The retainer is may be rotated relative to the housing to intentionally release the tube. European Patent Application EP 1 821 022 A1 is incorporated by reference as if fully set forth herein.

It is important that a quick connector maintain intended coupling during normal blow-off or pull-out conditions.

While known quick connectors, including the quick connector of European Patent Application EP 1 821 022 A1, have generally proven to be satisfactory for their intended purposes, a continuous need for improvement remains in the pertinent art.

SUMMARY

In accordance with one particular aspect, the present teachings provide a quick connector for releasably engaging a tube having a radial flange. The quick connector includes a housing, a retaining member and a blocking member. The housing is a generally tubular housing. The retaining member is carried by the housing and is movable from a first position to a second position. In the first position, the retaining member is operative to secure the tube relative to the housing in the first position. The blocking member is carried by the housing and operative to resisting movement of the retaining member from the first position to the second position.

In accordance with another particular aspect, the present teachings provide a quick connector for releasably engaging a tube having a radial flange. The quick connector includes a generally tubular housing, a retaining member and a blocking member. The generally tubular housing has an open end for receiving the tube. The retaining member is carried by the housing and is elastically expandable from a first position to a second position. The retaining member includes at least a pair of retention segments inwardly extending partially over the open end of the housing. Each retention segment has an innermost edge normally on a common circle having a diameter smaller than a maximum diameter of the radial flange when the retaining member is in the first position and radially displaceable from the common circle in the second position. The retaining member is operative to secure the tube relative to the housing in the first position. The blocking member is carried by the housing for resisting movement of the retaining member from the first position to the second position.

In accordance with still yet another particular aspect, the present teachings provide a quick connector including a housing, a retaining member, and a sealing member. The housing releasably receives the tube. The retaining member is carried by the housing and operative to secure the tube relative to the housing. The sealing member is disposed in the housing and operative to seal the tube relative to the housing. The sealing member is integrally formed to include an upper portion and a lower portion. Both of the upper and lower portions include an outer circumferential surface adjacent the housing and an inner circumferential surface for pressing against the tube.

Further areas of applicability will become apparent from the description provided herein. The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
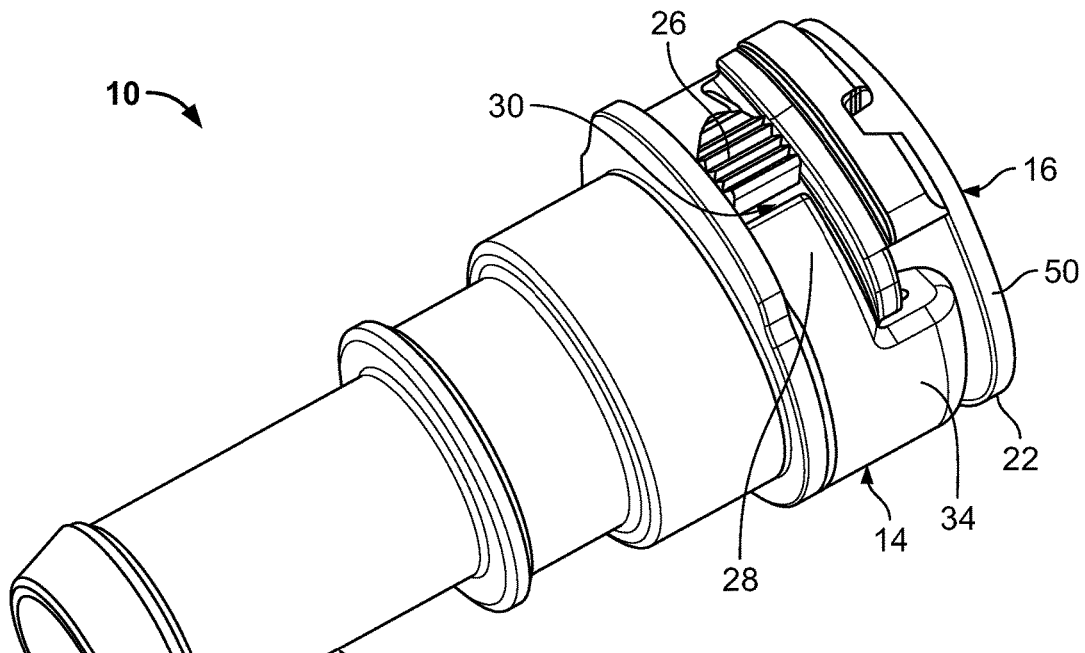
FIG. 1 is a perspective view of a quick connector in accordance with the present teachings.
Figure 2:
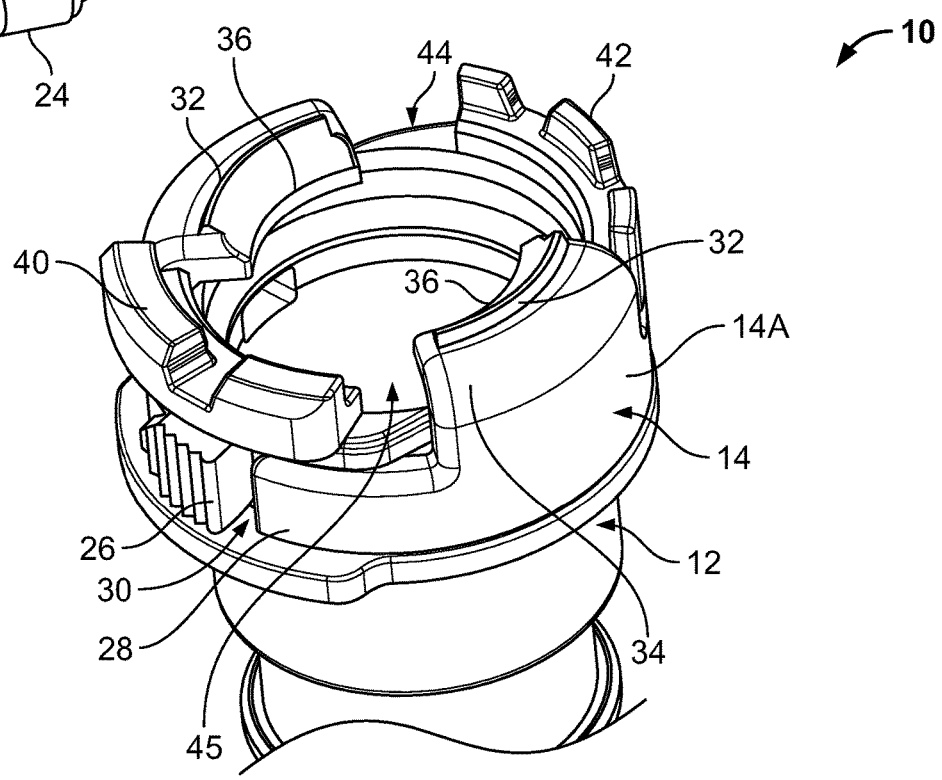
FIG. 2 is a perspective view of a distal end of the quick connector of FIG. 1, a blocking member of the quick connector removed from the quick connector for purposes of illustration.

Example embodiments will now be described more fully with reference to the accompanying drawings.

With reference to FIGS. 1 through 8 of the drawings, a quick connector constructed in accordance with the present teachings is illustrated and generally identified at reference character 10. The quick connector 10 may generally include a housing 12, a retaining member 14 and a blocking member 16. In various views, the quick connector 10 is shown incorporated into a fluid transfer assembly 18 including a tube 20.

In the exemplary embodiment illustrated, the quick connector 10 may be used for the transmission of fluids in the form of gas or liquid. For example, the quick connector 10 may be used in motor vehicle applications to couple various tubes and hoses to transmit vapors, ethylene glycol and other fluids. It will be appreciated, however, that the scope of the present teachings are not so limited and may readily be adapted for other vehicle applications or non-vehicle applications.

Figure 3:
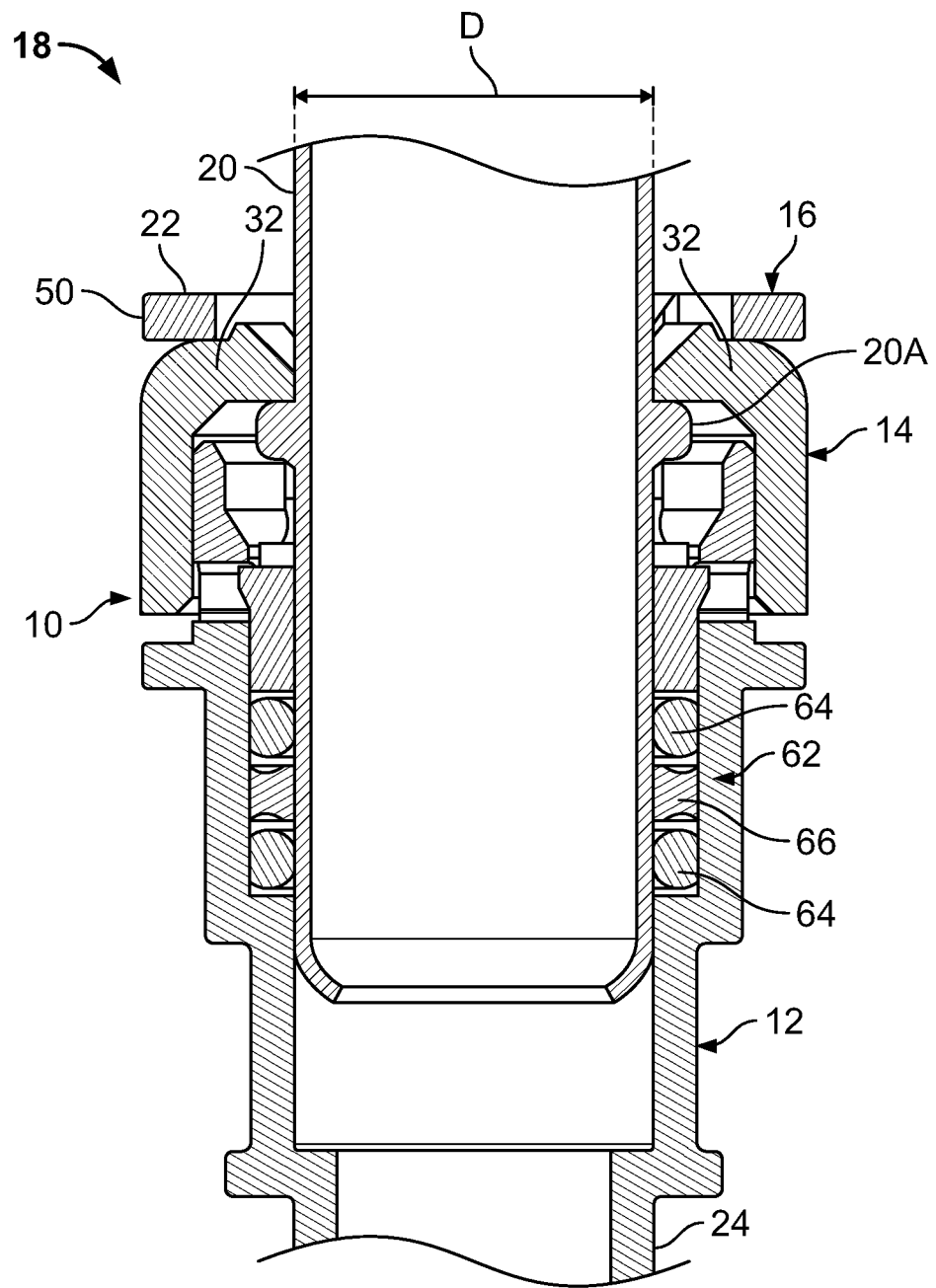
FIG. 3 is a cross-sectional view of the quick connector of FIG. 1, the quick connector shown normally retaining a tube.

In the cross-sectional view of FIG. 3, for example, the quick connector 10 is shown at a first end 22 operatively coupled to a tube 20. It will be understood that the opposite end 24 of the quick connector 10 may be conventionally attached to a hose. Insofar as the present teachings are concerned, it will be understood that the tube 20 shown in the drawings is both exemplary and of conventional construction. Briefly, the tube 20 is shown to include a radially extending flange 20A. The quick connector 10 of the present teachings may be readily adapted for various other tubes within the scope of the present teachings.

Figure 4:
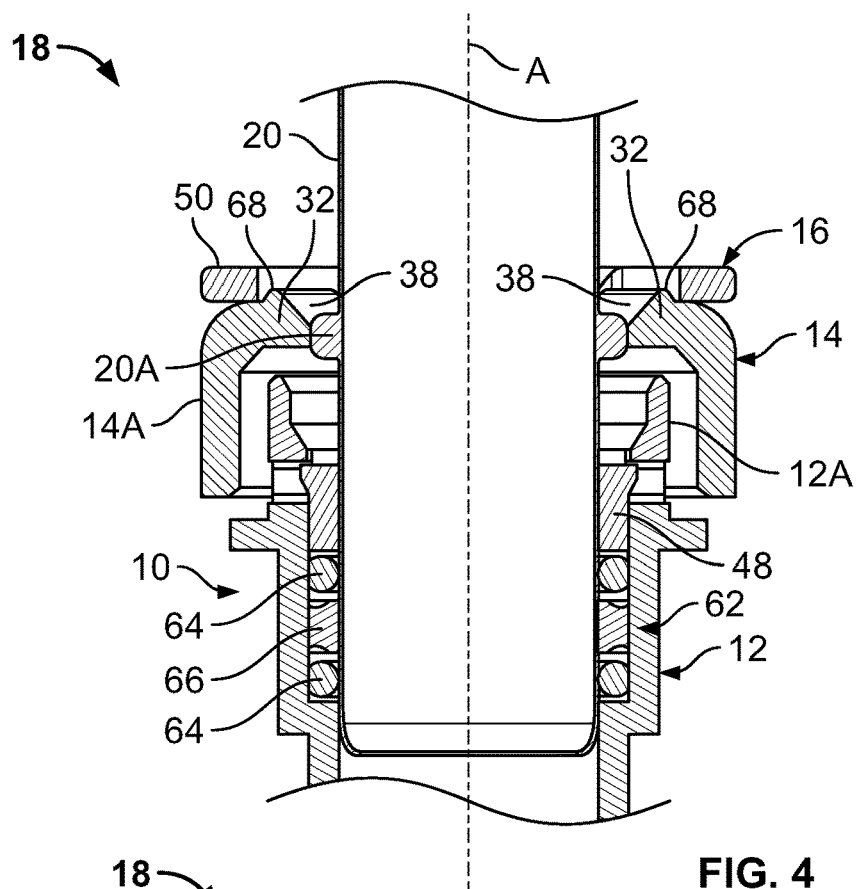
FIG. 4 is a cross-sectional view similar to FIG. 3, the quick connector shown during insertion of the tube.
Figure 5:
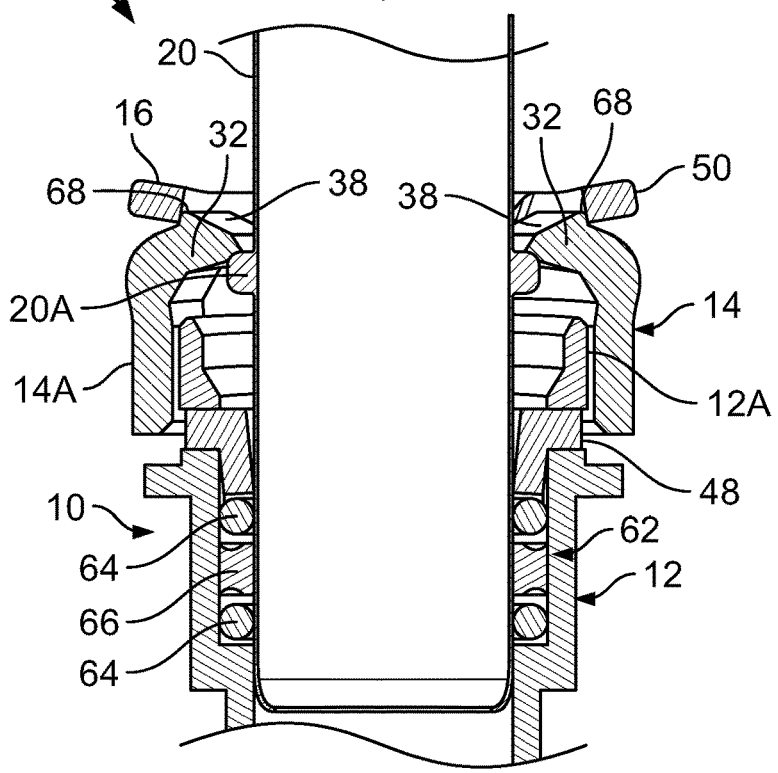
FIG. 5 is another cross-sectional view similar to FIG. 3, the quick connector shown retaining the tube during blow-off conditions.
Figure 6:
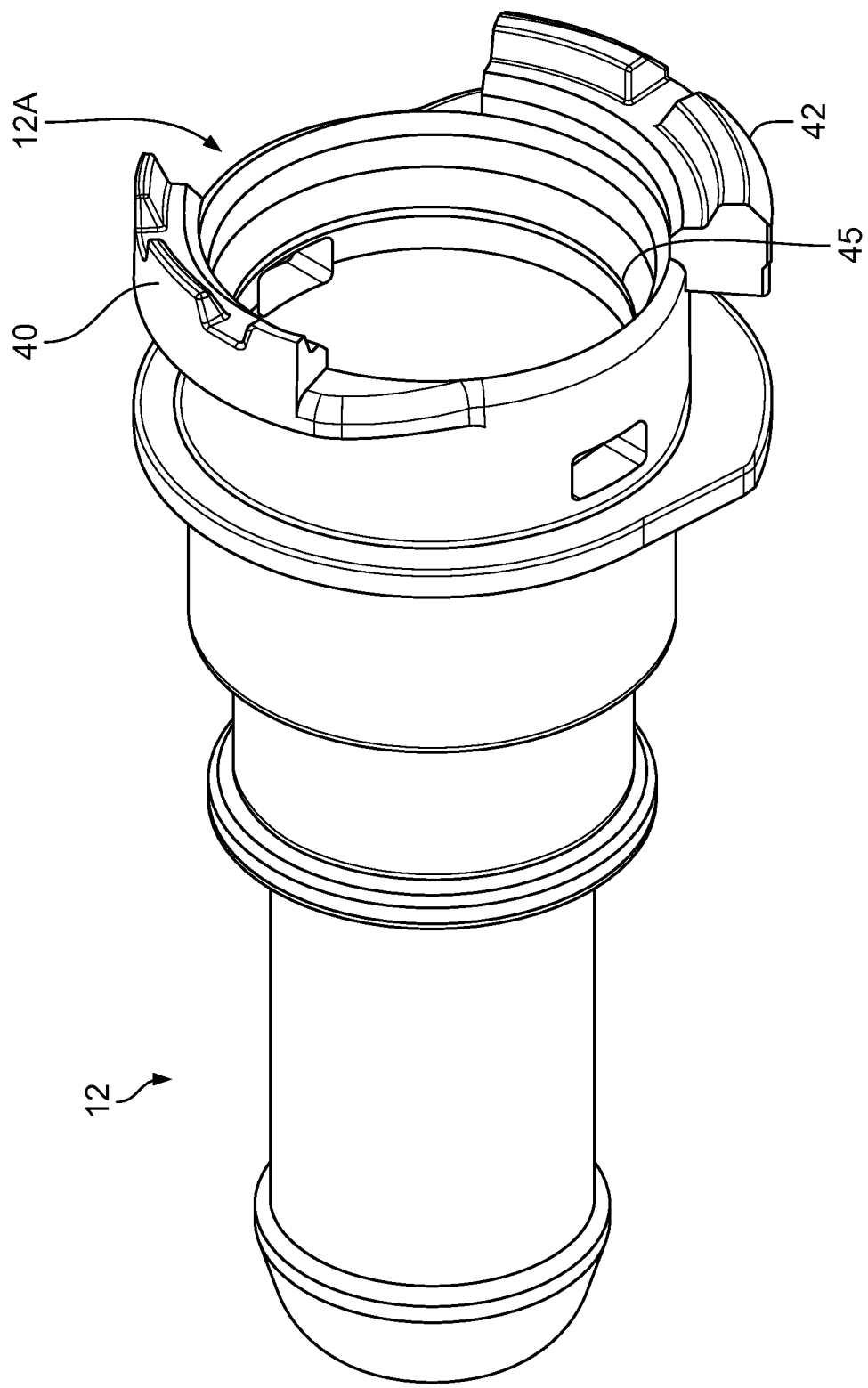
FIG. 6 is a perspective view of the housing of the quick connector of FIG. 1.
Figure 7:
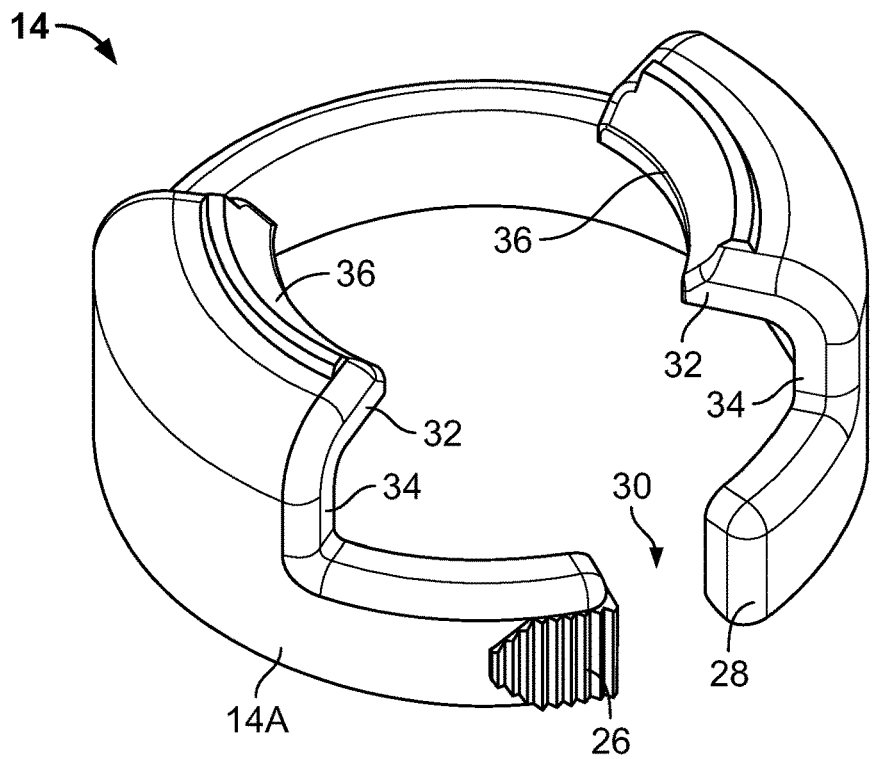
FIG. 7 is a perspective view of the retaining member of the quick connector of FIG. 1.
Figure 8:
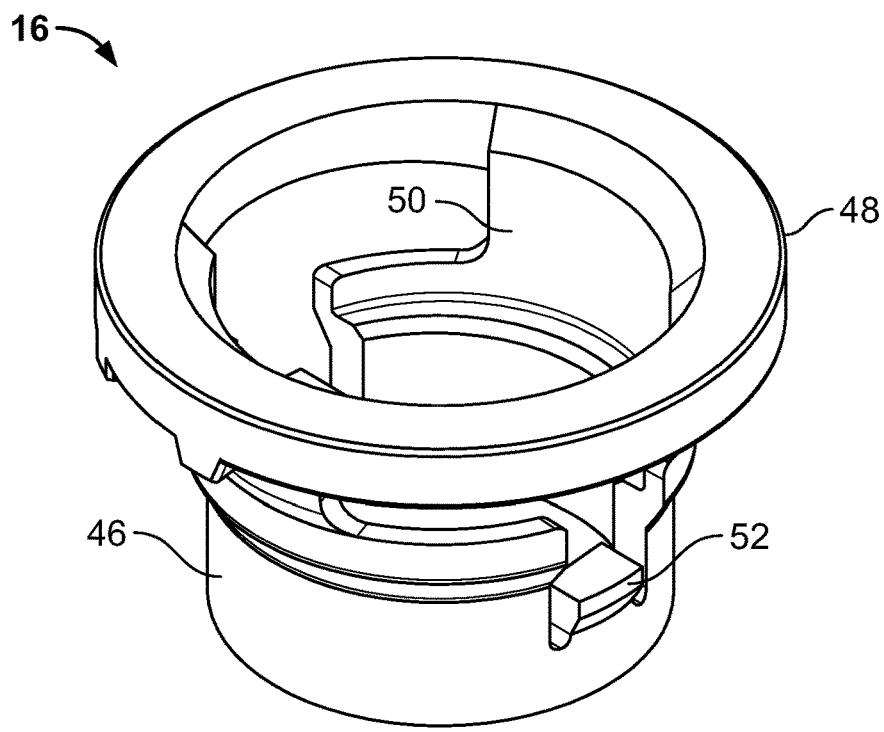
FIG. 8 is a perspective view of the blocking member of the quick connector of FIG. 1.

The retaining member 14 is carried by the housing 12 and normally functions to retain the tube 20 to the housing 12. As will be understood, the retaining member 14 may be moved from a first position to a second position. The first position is shown in FIG. 3, for example. The second position is shown in FIG. 4, for example. In the first position, the retaining member 14 normally retains the tube 20 to housing 12. In the second position, the retaining member 14 allows the tube 20 to be inserted into the housing 12 or the tube 20 to be removed from the housing 12. The blocking member 16 is carried by the housing 12 and operates to resist movement of the retaining member 14 from the first position to the second position. The blocking member 16 may be non-releasably carried by the housing 12 such that it is not readily removable by a user of the quick connector 10.

The retaining member 14 may circumferentially surround the housing 12 proximate an open proximal end 12A of the housing 12. The retaining member 14 may include a band portion 14A. In the embodiment illustrated, the band portion 14A substantially extends around the housing 12. In this regard, first and second ends 26 and 28 of the band portion 14A may be spaced apart by a gap 30. As such, the retaining member 14 will be understood to define an incomplete circle almost extending around the housing 12. The first end 26 may be formed to include a plurality of ribs to facilitate engagement by a user in a manner to be further discussed below for releasing the tube 20 from the housing 12.

The retaining member 14 may further include one or more retention segments 32. The retaining member 14 may include at least a pair of retention segments 32. As illustrated, the retaining member 14 includes first and second retention segments 32. The present teachings may be readily adapted, however, such that the retaining member 14 includes a single retention segment 32 or three or more retention segments 32.

The retention segments 32 may be connected to the band portion 14A through upwardly extending segments 34 and may inwardly extend partially over the open end 12A of the housing 12. As perhaps best shown in the perspective view of FIG. 2, free ends 36 of the retention segments 34 may be arcuately shaped and may each define a lead-in surface 38 that tapers inwardly and distally. An innermost edge of the retention segments 34 may normally lie on a common circle having a diameter D (see FIG. 3) when the retaining member 14 is in the first position. The innermost edges are radially displaceable from the common circle in the second position. The diameter D of the common circle 36 may be smaller than a maximum diameter of the flange 20A of the tube 20.

The retaining member 14 may be unitarily constructed of any suitable material. In one particular application, the retaining member 14 may be constructed of a thermoplastic material. For example, the retaining member 14 may be constructed of a polyamide such as polyphthalamide (PPA). Further preferably, the housing may be constructed of a glass reinforced polyphthalamide resin. One suitable material is commercially available from Solvay as Amodel® A-1933 HSL.

The housing 12 may be a generally tubular housing. In the embodiment illustrated, the housing 12 may include first and second upwardly extending segments 40 and 42 extending from the open distal end 12A (see FIGS. 2 and 6, for example). As illustrated, the upwardly extending segments 40 and 42 may be diametrically positioned on the housing 12. Both of the upwardly extending segments 40 and 42 may circumferentially extend through approximately 60 degrees. As such, first and second gaps 44 and 45 are located between the upwardly extending segments 40 and 42. The first and second gaps 44 and 45 may both circumferentially extend through approximately 120 degrees.

The housing 12 may be unitarily constructed of any suitable material. In one particular application, the housing 12 may be constructed of a thermoplastic material. For example, the housing 12 may be constructed of a polyamide such as polyphthalamide (PPA). Further preferably, the housing may be constructed of a glass reinforced polyphthalamide resin. One suitable material is commercially available from Solvay as Amodel® A-1933 HSL.

The blocking member 16 is generally top hat shaped. In this regard, the blocking member 16 may generally include a lower cylindrical portion 46 and an upper circular flange 48. The lower cylindrical portion 46 and the upper circular flange 48 may be axially connected by a pair of axially extending segments 50. The axially extending segments 50 are diametrically opposed on the blocking member 16 and both extend through approximately 45 degrees.

The lower cylindrical portion 46 may define a pair of outwardly extending tabs 52. The outwardly extending tabs 52 engage holes in the housing 12 to axially fix the blocking member 16 to the housing 12. The upper circular flange 48 of the blocking member 16 and the upwardly extending segments 40 and 42 of the housing 12 are formed with cooperating features to prevent relative rotation between the blocking member 16 and the housing 12. In the embodiment illustrated, the axially extending segments 52 of the blocking member 16 circumferentially align with the upwardly extending segments 40 and 42 of the housing 12.

The blocking member 16 may be unitarily constructed of any suitable material. In one particular application, the blocking member 16 may be constructed of a thermoplastic material. For example, the blocking member 16 may be constructed of a polyamide such as polyphthalamide (PPA). Further preferably, the housing may be constructed of a glass reinforced polyphthalamide resin. One suitable material is commercially available from Solvay as Amodel® AT-6115 HS.

The quick connector 10 further includes a sealing pack 62 disposed in the housing 12. The sealing pack 62 provides a seal between the tube 20 and the housing 12. As illustrated, the sealing pack 62 may include three discrete elements in the form of a pair of O-rings 64 and a spacer 66 between the O-rings 64.

In a first general assembly step, the quick connector 10 of the present teachings may be assembled by placing the sealing pack 62 into the housing 12.

In a second general assembly step, the outwardly extending tabs 54 of the blocking member 16 are axially aligned with the holes 56 in the housing 12 and the lower cylindrical portion 46 is axially advanced into the open end 12A of the housing 12. During initial insertion, the tabs 54 will elastically deflect inwardly until the tabs 52 meet and engage the holes 56 in the housing 12 to axially fix the blocking member 16 to the housing 12. The cooperating features of the upper circular flange 50 of the blocking member 16 and the upwardly extending segments 40 and 42 of the housing 12 engage to prevent relative rotation between the blocking member 16 and the housing 12.

In a third and final general assembly step, the retaining member 14 is elastically expanded so that it may be circumferentially positioned about the housing 12. When the retaining member 14 is positioned on the housing 12, the retention segments 28 are circumferentially located within the gaps 44 and 45. The retention segments 28 partially extend inwardly over the open end 12A of the housing 12.

The tube 20 may be quickly and easily releasably secured to the quick connector 10 by axially advancing an end of the tube 20 into the open end 12A of the housing 12. When the flange 20A of the tube 20 axially reaches the blocking member 16, the flange 20A contacts the lead-in surfaces 38 of the retention segments 32. Further axial advancement of the tube 20 radially expands the retaining member 14 from the first position to the second position. Insofar as the present teachings are concerned, the term "first position" shall mean by any position in which the innermost edges of the retention segments 34 lie on a common circle with a diameter less than the outer diameter of the flange 20A. The term "second position" shall mean any position in which the innermost edges of the retention segments 34 lie on a common circle with a diameter equal to or greater than the center diameter of the flange 20A. Alternatively, "first position" shall mean any position in which the flange 20A is allowed to axially pass the retention segments 34 and "second position" shall mean any position in which the flange 20A is prevented from axially passing the retention segments.

After the flange 20A of the tube 20 axially passes the retention segments 34 of the retention member 14, the retention member 14 elastically returns to the first position. Removal of the tube 20 from the housing 12 is normally prevented through engagement of the retention segments 34 with the flange 20A. During blow-off or pull-out conditions, the blocking member 16 may operate to limit movement of the retaining member 14 from the first position to the second position. In this regard, the blocking member 16 may otherwise elastically deform sufficiently enough to allow withdrawal of the tube 20 from the housing 12. As there are no lead-in surfaces on the bottom of the retention segments 34, the retention segments must be deplaced both upwardly and outwardly. The blocking member 16 may prevent at least one of upward and outward movement of the retention segments 34.

In one application, the blocking member 16 may at least prevent radially outward movement of the retention segments 34. In this regard, the retention segments 34 may define radially outward facing stop surfaces 68 that engage an inner diameter of the upper circular flange 50 of the blocking member 16. Such engagement is shown on FIG. 5. When the flange 20A presses against a lower side of the retention segments 32 during blow off conditions, the retention segments deflect such that the surfaces 68 engage the inner diameter of the flange 50 and thereby prevent radial expansion of the retaining member 14 from the first position to the second position. The stop surfaces 68 may normally be disposed at an angle to a longitudinal axis A of the quick connector 10. For example, the angle may be greater than zero and less than approximately 45°. In one application, the angle is approximately 25°.

The retaining member 14 may be manually moved from the first position to the second position where it is desired to remove the tube 20. The first free end 26 may be engaged by the user and circumferentially forced away from the second end 28. In response to this movement, the segments 34 and 36 circumferentially move within the gaps 44 and 45 and the innermost edges of the retention segments 34 are sufficiently separated from one another to move the retaining member 14 from the first position to the second position.

Figure 9:
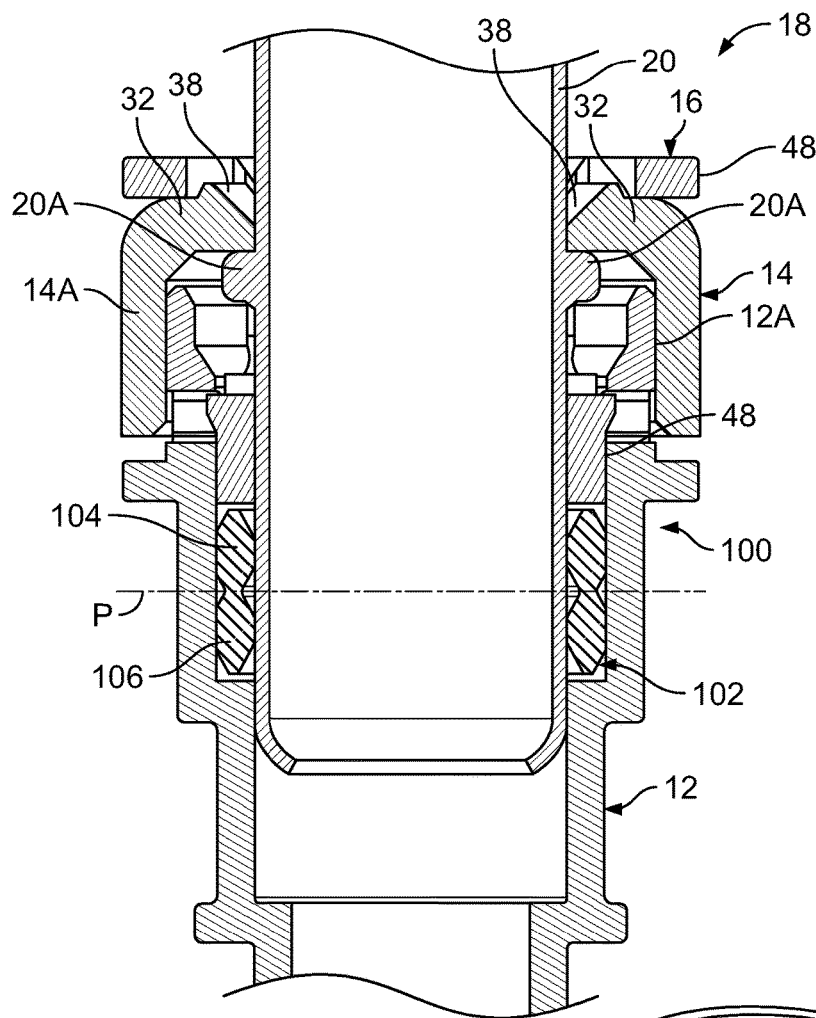
FIG. 9 is a cross-sectional view of another quick connector in accordance with the present teachings.
Figure 10:
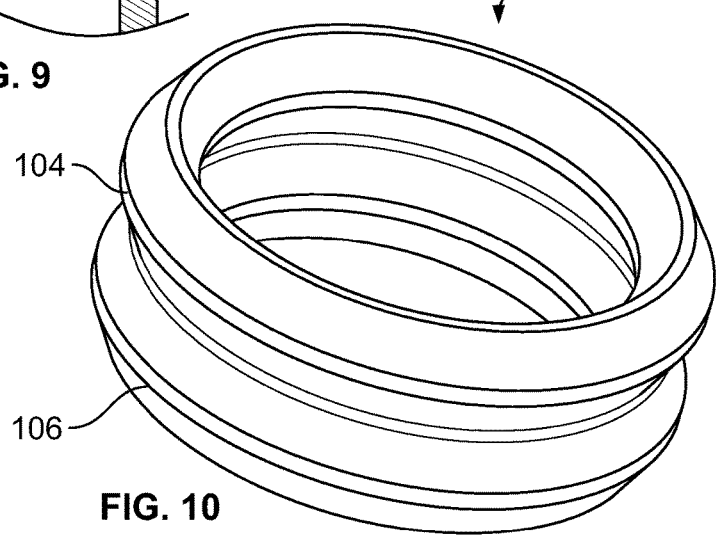
FIG. 10 is a perspective view of the sealing member of the quick connector of FIG. 11.

Turning to FIGS. 9 and 10, another quick connector in accordance with the present teachings is illustrated and generally identified at reference character 100. Like reference characters have been used throughout the drawings to identify elements common between the quick connector 10 and the quick connector 10'. It will be understood that the quick connector 100 differs from the quick connector 10 only in that the sealing pack 62 (including the discrete O-rings 64 and the spacer 66) of the quick connector 10 are replaced with a unitarily formed sealing member 102.

The sealing member 102 is illustrated to generally include a first portion 104 and a second portion 106. In the embodiment illustrated, the first and second portions 104 and 106 are mirror images of one another about an intersecting plane P. In the cross-sectional view of FIG. 10, the first portion 104 is an upper portion and the second portion 106 is a lower portion. Given the symmetry of the sealing member 102, however, the sealing member 102 may be inserted into the housing 12 such that the first portion 104 is the lower portion and the second portion 106 is the upper portion. Both of the upper and lower portions 104 and 106 include an outer circumferential surface adjacent the housing and an inner circumferential surface for pressing against the tube.

In alternate embodiments, the sealing member 102 may be constructed to include three or more partners similar to the first and second portions 104 and 106. Important to this aspect of the present teachings is the symmetry of the sealing member 102 that allows the sealing member 102 to be inserted in either of two orientations. In this manner, the sealing member 102 cannot be incorrectly inserted into the housing 12.

The sealing member 102 may be unitarily constructed of suitable material. In one particular application, the sealing member 102 may be constructed of EPDM (ethylene propylene diene monomer) material. It will be appreciated, however, that other materials may be used within the scope of the present teachings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A quick connector for releasably engaging a tube having a radial flange, the quick connector comprising:
    a generally tubular housing carrying a blocking member; and
    a retaining member carried by the housing, the retaining member being movable from a first position to a second position with resistance provided by the blocking member, the retaining member including at least a pair of retention segments inwardly extending partially over an open end of the housing, each retention segment having an innermost edge normally on a common circle having a diameter smaller than a maximum diameter of the radial flange when the retaining member is in the first position and radially displaceable from the common circle in the second position, and a band portion defining an incomplete circle circumferentially surrounding the housing, the retaining member operative to secure the tube relative to the housing in the first position.

2. The quick connector of claim 1, wherein the retaining member is radially expandable from the first position to the second position.

3. The quick connector of claim 2, wherein the retaining member elastically expands from the first position to the second position.

4. The quick connector of claim 2, wherein the retaining member elastically expands from the first position to the second position in response to axial advancement of the tube into the housing.

5. The quick connector of claim 1, wherein the blocking member includes a circumferential flange and a cylindrical portion.

6. The quick connector of claim 1, wherein the retaining member is manually movable from the first position to the second position to release the tube from the housing.

7. The quick connector of claim 1, in combination with the tube.

8. A quick connector for releasably engaging a tube having a radial flange, the quick connector comprising:
    a generally tubular housing having an open end for receiving the tube;
    a retaining member carried by the housing, the retaining member being elastically expandable from a first position to a second position, the retaining member including at least a pair of retention segments inwardly extending partially over the open end of the housing, each retention segment having an innermost edge normally on a common circle having a diameter smaller than a maximum diameter of the radial flange when the retaining member is in the first position and radially displaceable from the common circle in the second position, the retaining member operative to secure the tube relative to the housing in the first position; and
    a blocking member carried by the housing for resisting movement of the retaining member from the first position to the second position,
    wherein the retaining member includes a band portion defining an incomplete circle extending circumferentially about the housing.

9. The quick connector of claim 8, wherein the retaining member includes first and second retention segments diametrically positioned on the retaining member.

10. The quick connector of claim 8, wherein the blocking member is top hat shaped including a lower cylindrical portion and an upper circular flange.

11. The quick connector of claim 10, wherein the lower cylindrical portion and the upper circular flange are connected by a pair of axially extending segments.

12. The quick connector of claim 10, wherein the retention segments are axially positioned between the lower cylindrical portion and the upper circular flange.

13. The quick connector of claim 10, wherein each retention segment defines an outwardly facing stop surface for engaging an inner diameter of the upper circular flange.

14. The quick connector of claim 13, wherein the outwardly facing stop surfaces are disposed at an angle relative to a longitudinal axis of the quick connector.

15. The quick connector of claim 14, wherein the angle is greater than zero and less than 45°.

16. The quick connector of claim 14, wherein the angle is approximately 25°.

17. The quick connector of claim 8, wherein the retaining member is manually movable from the first position to the second position for intentionally releasing the tube from the housing.

18. A quick connector for releasably engaging a tube having a radial flange, the quick connector comprising:
   a housing for releasably receiving the tube, the housing carrying a blocking member;
   a retaining member carried by the housing, the retaining member being elastically expandable from a first position to a second position with resistance provided by the blocking member, the retaining member including at least a pair of retention segments inwardly extending partially over an open end of the housing, each retention segment having an innermost edge normally on a common circle having a diameter smaller than a maximum diameter of the radial flange when the retaining member is in the first position and radially displaceable from the common circle in the second position, and a band portion defining an incomplete circle circumferentially surrounding the housing, the retaining member operative to secure the tube relative to the housing in the first position; and
   a sealing member disposed in the housing for sealing the tube relative to the housing, the sealing member integrally formed to include an upper portion and a lower portion, both of the upper and lower portions including an outer circumferential surface adjacent the housing and an inner circumferential surface for pressing against the tube.

19. The quick connector of claim 18, wherein the upper and lower segments of the sealing member are mirror images of one another about a bisecting plane.

* * * * *